(12) United States Patent
Sugiyama et al.

(10) Patent No.: US 11,738,504 B2
(45) Date of Patent: Aug. 29, 2023

(54) SHAPING METHOD AND SHAPING DEVICE

(71) Applicant: CANON KABUSHIKI KAISHA, Tokyo (JP)

(72) Inventors: Akira Sugiyama, Yokohama (JP); Hirokazu Usami, Yokohama (JP); Yohei Masada, Tokyo (JP); Takaharu Aotani, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 647 days.

(21) Appl. No.: 16/692,050

(22) Filed: Nov. 22, 2019

(65) Prior Publication Data
US 2020/0086559 A1  Mar. 19, 2020

Related U.S. Application Data

(63) Continuation of application No. PCT/JP2018/020702, filed on May 30, 2018.

(30) Foreign Application Priority Data

May 31, 2017 (JP) .............................. JP2017-108246
May 29, 2018 (JP) .............................. JP2018-102240

(51) Int. Cl.
*B29C 64/153* (2017.01)
*B22F 10/14* (2021.01)
(Continued)

(52) U.S. Cl.
CPC ............ *B29C 64/153* (2017.08); *B22F 1/052* (2022.01); *B22F 10/14* (2021.01); *B22F 10/34* (2021.01);
(Continued)

(58) Field of Classification Search
CPC ... B29C 64/153; B29C 64/165; B29C 64/295; B22F 1/052; B22F 10/10; B22F 10/14;
(Continued)

(56) References Cited

U.S. PATENT DOCUMENTS 5,753,274 A   5/1998  Wilkening et al.
6,042,774 A   3/2000  Wilkening et al.
(Continued)

FOREIGN PATENT DOCUMENTS

JP   8-192468 A   7/1996
JP   8-281807 A   10/1996
(Continued)

OTHER PUBLICATIONS

Aotani et al., U.S. Appl. No. 16/720,316, filed Dec. 19, 2019.
(Continued)

*Primary Examiner* — Anthony M Liang
*Assistant Examiner* — Danny N Kang
(74) *Attorney, Agent, or Firm* — Venable LLP

(57) ABSTRACT

An object shaping method includes a step of forming a powder layer using first powder, a step of placing second powder having an average particle diameter smaller than an average particle diameter of the first powder at a part of a region of the powder layer, and a first heating step of heating the powder layer in which the second powder is placed. The average particle diameter is equal to or larger than 1 nm and equal to or smaller than 500 nm, and the first heating step performs heating the powder layer at a temperature at which particles contained in the second powder are sintered or melted.

30 Claims, 12 Drawing Sheets

(51) Int. Cl.
*B22F 1/052* (2022.01)
*B33Y 10/00* (2015.01)
*B22F 12/00* (2021.01)
*B22F 10/34* (2021.01)
*B22F 10/38* (2021.01)

(52) U.S. Cl.
CPC .......... *B22F 10/385* (2021.01); *B22F 12/224* (2021.01); *B33Y 10/00* (2014.12)

(58) Field of Classification Search
CPC ...... B22F 10/34; B22F 10/385; B22F 12/224; B22F 2998/10; B22F 2999/00; B33Y 10/00; B33Y 40/20; B33Y 30/00; B33Y 70/00; B28B 1/001; C04B 2235/528; C04B 2235/5296; C04B 2235/5436; C04B 2235/5445; C04B 2235/5454; C04B 2235/616; C04B 35/185; C04B 35/457; C04B 35/46; C04B 35/468; C04B 35/50; C04B 35/58092; C04B 35/6303; C04B 2235/6026; C04B 35/5611; C04B 35/5622; C04B 35/563; C04B 35/565; C04B 35/58014; C04B 35/6316; C04B 2235/80; C04B 35/053; C04B 35/117; C04B 35/14; C04B 35/2683; C04B 35/453; C04B 35/488; C04B 35/51; C04B 35/5805; C04B 35/58064; C04B 35/58071; C04B 35/58078; C04B 35/58085; C04B 35/581; C04B 35/584; Y02P 10/25

See application file for complete search history.

(56) References Cited

U.S. PATENT DOCUMENTS

| | | |
|---|---|---|
| 10,183,332 B2 | 1/2019 | Hirata et al. |
| 10,532,383 B2 | 1/2020 | Saito et al. |
| 2015/0050463 A1 | 2/2015 | Nakano et al. |
| 2015/0224575 A1 | 8/2015 | Hirata |
| 2017/0014910 A1* | 1/2017 | Ng .................. B29C 64/153 |
| 2017/0014950 A1 | 1/2017 | Okada |
| 2019/0111487 A1 | 4/2019 | Hirata et al. |
| 2020/0206812 A1 | 7/2020 | Aotani et al. |

FOREIGN PATENT DOCUMENTS

| | | |
|---|---|---|
| JP | 2005-144870 A | 6/2005 |
| JP | 2007-270227 A | 10/2007 |
| JP | 2013-161544 A | 8/2013 |
| JP | 2015-038237 A | 2/2015 |
| JP | 2015-147984 A | 8/2015 |
| JP | 2015-205485 A | 11/2015 |
| WO | 2015/141032 A1 | 9/2015 |
| WO | 2017/006610 A1 | 1/2017 |
| WO | 2018/221563 A1 | 12/2018 |

OTHER PUBLICATIONS

International Search Report in International Application No. PCT/JP2018/020702 (dated Aug. 2018).
Notice of Reasons for Refusal in Japanese Application No. 2018-102240 (dated Feb. 2022).
International Preliminary Report on Patentability in International Application No. PCT/JP2018/020702 (dated Dec. 2019).

* cited by examiner

SHAPING METHOD AND SHAPING DEVICE

CROSS-REFERENCE TO RELATED APPLICATIONS

This application is a Continuation of International Patent Application No. PCT/JP2018/020702, filed May 30, 2018, which claims the benefit of Japanese Patent Applications No. 2017-108246, filed May 31, 2017 and No. 2018-102240, filed May 29, 2018, both of which are hereby incorporated by reference herein in their entirety.

BACKGROUND OF THE INVENTION

Field of the Invention

The present invention relates to a technique for shaping a three-dimensional object by using a particulate material.

Background Art

A layering-shaping method in which a shaping material is layered in accordance with slice data of a three-dimensional object model that is a shaping object has attracted attention as a method for shaping three-dimensional objects. Conventionally, shaping using a resin material has been the mainstream, but recently, the number of devices that perform shaping using a shaping material other than a resin, such as metal or ceramics, has been increasing.

Patent Literature 1 discloses a method for obtaining a shaped article by repeating the steps of forming a thin layer of a powder material on a substrate, and then locally heating at a high temperature with a laser to sinter the powder material. In the method of PTL 1, where a structure is formed on a region where the powder material is not sintered (hereinafter referred to as "non-shaping region"), such as an overhang structure or a structure having a movable part, the powder material present on top of the non-shaping region needs to be sintered. Since warpage may occur due to local heat shrinkage at that time, for certain shapes of the structure, it is necessary to perform shaping by adding a support body (also referred to as a support structure) that suppresses the warpage. Since the support body is an essentially unnecessary structure, depending on the shape of the three-dimensional object model, it may be necessary to remove the support body after shaping. Accordingly, it is difficult to shape a three-dimensional object model with a shape or structure that makes it difficult to remove the support body. In particular, since it is necessary to use a metal working machine when removing a support body from a metal shaped article, a fine structure that is physically difficult to remove by the metal working machine cannot be shaped. Further, since ceramics are easily broken by a load, it has been difficult to selectively remove a support body from a ceramic shaped article.

Further, a technique is known by which a metal or ceramic shaped article is obtained by producing the shape of a shaped article by using a mixed material of particles or a metal, ceramic and the like and a resin binder and then removing the resin (binder removal) and sintering. PTL 2 discloses a method for producing a composite shaped article of a resin and metal particles by repeatedly performing a step applying a liquid binder to a metal particle-containing layer and solidifying the binder, and then removing a region that has not been solidified. The resulting composite shaped article is heat treated to remove the binder and sinter, thereby obtaining a metal shaped article.

In the method of PTL 2, when a shape having an overhang structure, a structure having a movable part, or the like is produced, a powder not coated with a binder (non-solidified powder) is shaped instead of a support body. However, since the powder as a replacement of the support body needs to be removed before binder removal and sintering, the shape cannot be maintained after binder removal and may be deformed or broken. In addition, in the case in which shaped portions with different thicknesses are co-present in the shaped article, where binder removal in a thick part is incomplete, the amount of impurities in the shaped article increases, and where binder removal in the thick part is complete, a thin part can be deformed or broken. Therefore, in the shaping method of PTL 2, there are limitations on the shape and size that can be shaped. In addition, where heat treatment is performed without removing the powder replacing the support body in order to maintain the shape, metal particles in the non-shaping region may coalesce with metal particles in the shaping region, and the desired shape may not be obtained.

Further, the shape of the composite shaped article of resin and metal is maintained by the resin component, but where the amount of the resin component is large, deformation and breakage during binder removal and voids in the formed shaped article may be caused. Meanwhile, where the amount of the resin component is small, the strength of the resin-metal composite shaped article is weakened, and the shaped article may be broken when removing the particles in the non-shaping region.

As described above, there is a limit to the shape that can be shaped by the conventional shaping method. In particular, in a method using a shaping material such as a metal or ceramics, a desired physical property or shape are sometimes difficult to realize by shaping.

Therefore, an object of the present invention is to provide a shaping technique with few restrictions on shapes that can be shaped.

CITATION LIST

Patent Literature

PTL 1 Japanese Patent Application Publication No. 2015-38237

PTL 2 Japanese Patent Application Publication No. 2015-205485

SUMMARY OF THE INVENTION

According to the first aspect, it is provided an object shaping method, including:

a step of forming a powder layer using first powder;

a step of placing second powder having an average particle diameter smaller than an average particle diameter of the first powder at a part of a region of the powder layer; and a first heating step of heating the powder layer in which the second powder is placed, wherein the average particle diameter is equal to or larger than 1 nm and equal to or smaller than 500 nm, and the first heating step performs heating the powder layer at a temperature at which particles contained in the second powder are sintered or melted.

According to the second aspect, it is provided an object shaping device, including:

a powder layer forming means configured to form a powder layer by using first powder;

a placing means configured to place second powder having an average particle diameter smaller than an average particle diameter of the first powder at a part of a region of the powder layer; and a heating means configured to heat the powder layer such that particles contained in the second powder are sintered or melted.

Further features of the present invention will become apparent from the following description of exemplary embodiments with reference to the attached drawings.

DESCRIPTION OF THE EMBODIMENTS

Figure 1A:
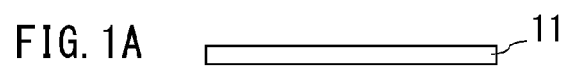
FIG. 1A to 1H schematically illustrate a shaping method according to an embodiment of the present invention.

The present invention relates to a shaping method for producing a three-dimensional shaped article using a particulate material. The method of the present invention can be advantageously used in a shaping process in a shaping device called an additive manufacturing (AM) system, a three-dimensional printer, a rapid prototyping system, or the like.

Hereinafter, the present invention will be described in detail with reference to preferred embodiments and examples of the present invention. In each drawing, the same reference symbol is provided to the location which indicates the same member or a corresponding member. In particular, a well-known technique or a publicly known technique in the pertinent technical field can be adopted for configurations and processes not illustrated or described. In addition, redundant description may be omitted.

(Shaping Method)

The shaping method according to the embodiment of the present invention generally includes the following (Step 1) to (Step 4).

(Step 1) A step of forming a powder layer using first particles.

(Step 2) A step of placing second particles on a shaping region in the powder layer.

(Step 3) A step of sintering the second particles and fixing the first particles to each other in the shaping region.

(Step 4) A step of removing the first particles outside the shaping region.

By performing the above (Step 1) to (Step 4), it is possible to form a sheet-shaped (or plate-shaped) shaped article having a thickness corresponding to one powder layer. Furthermore, by repeating the above (Step 1) and (Step 2) and layering a large number of powder layers, it is possible to form a three-dimensional shaped article.

(Description of Each Step)

Hereinafter, each step of the shaping method will be described with reference to FIGS. 1A to 1H, FIGS. 2A to 2G, and FIG. 3. FIGS. 1A to 1H and FIGS. 2A to 2G schematically illustrate the flow of the shaping method of the present embodiment. FIGS. 1A to 1H are examples of a sequence in which (Step 4) is performed after repeating (Step 1) to (Step 3) a plurality of times, and FIGS. 2A to 2G are examples of a sequence in which (Step 3) and (Step 4) are performed after repeating (Step 1) and (Step 2) alternately a plurality of times. FIG. 3 is an enlarged view schematically illustrating the structure of the powder layer.

In addition, it is assumed that before starting shaping, slice data for forming each layer are generated from three-dimensional shape data of the shaping object by a shaping device or an external device (for example, a personal computer). As the three-dimensional shape data, data created by a three-dimensional CAD, a three-dimensional modeler, a three-dimensional scanner, or the like can be used. For example, an STL file or the like can be preferably used. The slice data are obtained by slicing the three-dimensional shape of the shaping object at a predetermined interval (thickness), and include information such as a cross-sectional shape, a layer thickness, and a material arrangement. Since the thickness of the layer affects the shaping accuracy, the thickness of the layer may be determined according to the required shaping accuracy and the particle diameter of the particles used for shaping.

(Step 1) Step of Forming a Powder Layer Using a First Powder

Figure 2A:
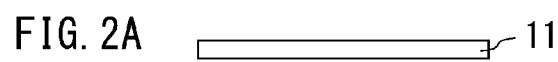
FIGS. 2A to 2G schematically illustrate a shaping method according to an embodiment of the present invention.
Figure 3:
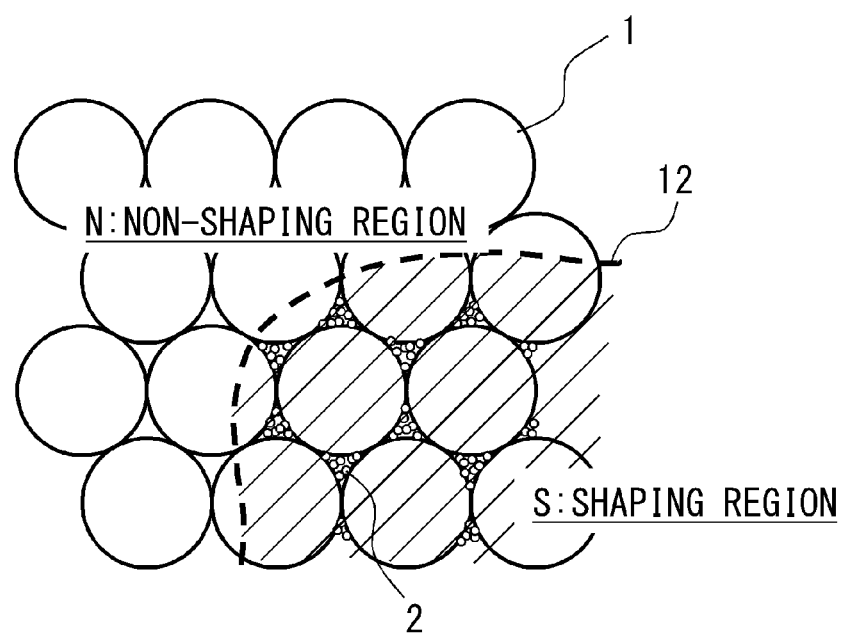
FIG. 3 schematically illustrate a shaping method according to an embodiment of the present invention.

In this step, a powder layer 11 is formed using the first powder including first particles 1 based on the slice data of the shaping object (FIGS. 1A and 2A). In the present description, an aggregate of a plurality of particles is referred to as a "powder", a configuration obtained by leveling a powder to a predetermined thickness is referred to as a "powder layer", and a configuration obtained by layering a plurality of powder layers is referred to as a "layered body". At the stage of the present step, the individual particles constituting the powder layer 11 are not fixed, but the form of the powder layer 11 is maintained by the frictional force acting between the particles.

As the first particles 1 constituting the first powder forming the powder layer 11, for example, resin particles, metal particles, ceramic particles, and the like can be used. As mentioned hereinabove, with the conventional shaping methods, there is a limit to the shapes that can be shaped with metal or ceramics, because post-processing (such as removal of a support body) is difficult. By contrast, the method of the present embodiment can easily shape a complex shape or a fine shape even with a metal or ceramic as described hereinbelow. Therefore, shaping using metal particles or ceramic particles as the first particles is one of the objects to which the shaping method of this embodiment can be preferably applied.

Examples of metals that can be used as the first particles 1 include copper, tin, lead, gold, silver, platinum, palladium, iridium, titanium, tantalum, and iron.

Further, a metal alloy such as a stainless alloy, a titanium alloy, a cobalt alloy, an aluminum alloy, a magnesium alloy, an iron alloy, a nickel alloy, a chromium alloy, a silicon alloy, or a zirconium alloy may be used as the first particles 1.

Further, a material obtained by adding a nonmetallic element such as carbon to a metal, such as carbon steel, may be used as the first particle 1.

Further, oxide ceramics or non-oxide ceramics may be used as the first particles. Examples of oxide ceramics include metal oxides such as silica, alumina, zirconia, titania, magnesia, cerium oxide, zinc oxide, tin oxide, uranium oxide, barium titanate, barium hexaferrite, and mullite. Examples of non-oxide ceramics include silicon nitride, titanium nitride, aluminum nitride, silicon carbide, titanium carbide, tungsten carbide, boron carbide, titanium boride, zirconium boride, lanthanum boride, molybdenum silicide, iron silicide, and barium silicide. The first particles may be composite particles of a plurality of types of metals or composite particles of a plurality of types of ceramics.

The first powder may include a substance other than the first particles 1. For example, for the purpose of facilitating the molding of the powder layer 11, maintaining the form of the powder layer 11, or favorably controlling the diffusion of the liquid applied in (Step 2) described hereinbelow, an additive may be added to the first powder. As a result, the shaping can be facilitated and the shaping accuracy can be improved. Further, a plurality of types of first particles 1 made of different materials may be mixed in the first powder.

The average particle diameter of the first powder is preferably set to a size that does not cause aggregation in order to form the powder layer 11 satisfactorily. In addition, the average particle diameter of the first particles 1 is preferably set to a size suitable for the diffusion of the liquid applied in (Step 2), the particle fixation in the heat treatment of (Step 3), and the strength and function requirements of the shaped article. Specifically, the volume-based average particle diameter of the first particles 1 may be selected from a range of at least 1 μm and not more than 500 μm, and preferably at least 1 μm and not more than 100 μm. Where the average particle diameter is at least 1 μm, the aggregation of particles during the formation of the powder layer is suppressed, and the layer formation with few defects tends to be facilitated.

The measurement of the average particle diameter can be performed using a laser diffraction/scattering particle size distribution measuring apparatus LA-950 (manufactured by HORIBA). The dedicated software provided with the apparatus is used for setting the measurement conditions and analyzing the measurement data. As a specific measurement method, first, a batch type cell including a measurement solvent is set in a laser diffraction/scattering type particle size distribution measuring apparatus LA-950 (manufactured by Horiba, Ltd.), and the optical axis and background are adjusted. Here, it is necessary to select a solvent that does not dissolve the particles to be measured. Moreover, an appropriate dispersing agent may be added, as needed, to the solvent to improve the dispersion of the particles to be measured. The powder to be measured is added to the batch cell until the transmittance of the tungsten lamp reaches 95% to 90%, the particle size distribution is measured, and the volume-based average particle diameter can be calculated from the obtained measurement results.

The first powder may include a plurality of groups of first particles 1 having different average particle diameters (it goes without saying that the average particle diameter of each group is preferably set within the above-described numerical range). Where the first powder includes a plurality of groups of particles having different average particle diameters and the particle size distribution of the first powder is measured, a peak indicating a high abundance ratio appears in the vicinity of the average particle diameter of each group.

For example, when the powder layer 11 is formed by mixing the first group of particles having a relatively large average particle diameter and the second group of particles having a relatively small average particle diameter, the particles of the second group can enter the gaps between the particles of the first group, and voids in the powder layer 11 can be reduced. At this time, it is preferable that the average particle diameter of the second group of particles be larger than the average particle diameter of the second particles described hereinbelow and not more than 0.41 times of the average particle diameter of the first group of particles. Where the ratio of the average particle diameters of the first group of particles and the second group of particles is set in this way, the second group of particles can be disposed in the particle gaps (octahedral sites) in the case where the first group of particles forms a close-packed structure. Therefore, the space filling rate of the powder layer 11 can be increased as much as possible. As a result, a shaped article with a small porosity can be produced. The first group of particles and the second group of particles are preferably particles of the same material, but may be particles of different materials.

The first particles 1 preferably have an average circularity of at least 0.94, and more preferably at least 0.96. Where the average circularity of the first particles 1 is at least 0.94, the particles have a structure close to a sphere, and the number of points where the particles are in point contact with each other can be reduced. As a result, the flowability of the first powder including the first particles 1 is improved, and when the powder layer 11 is formed, the first particles 1 are likely to be closely packed, so that the powder layer 11 with fewer voids is likely to be formed.

The circularity of the particles can be measured as follows, and the average circularity can be obtained by averaging the circularity obtained by measuring at least ten arbitrary particles.

Circularity=(perimeter of a circle having the same area as the projected area of the particle)/(perimeter of the projected image of the particle)

Here, the "projected image of the particle" can be obtained by binarizing the particle image. The "projected area of the particle" is the area of the projected image of the particle, and the "perimeter of the projected image of the particle" is the length of the outline of the projected image of the particle.

The circularity is an index indicating the complexity of the shape of the particle, and is 1.00 when the particle is a perfect sphere. The circularity becomes smaller as the projected image of the particle deviates from the circle. The circularity of the particle can be measured using image processing of an observation image of an electron microscope and the like, and a flow-type particle image measuring device (for example, FPIA-3000 type manufactured by Toa Medical Electronics Co., Ltd.).

For example, as disclosed in Japanese Patent Application Publication No. 8-281807, the powder layer 11 can be formed using a container having an upper opening, a support body that is set inside the container and can be raised and lowered, and a material supply device provided with a wiper. Specifically, one powder layer 11 can be formed by adjusting the upper surface of the support to a position that is lower than the upper edge of the container by a thickness of one layer, supplying the material onto a flat plate by the material supply device and then flattening by the wiper. Alternatively, a powder layer 11 having a desired thickness may be formed by supplying the first powder onto a flat surface (the surface of the stage or the shaped article being fabricated) and leveling the surface of the powder with a layer thickness regulating means (for example, a blade). Further, the powder layer 11 may be pressurized by a pressurizing means (for example, a pressure roller, a pressure plate, etc.). Since the number of contact points between the particles is increased by pressurization, defects in the shaped article are unlikely to be formed. In addition, since the first particles 1 in the powder layer are densely present, the movement of the first particles 1 during the treatment of the subsequent steps (Step 2) and (Step 3) (the collapse of the shape of the powder layer 11) is suppressed, and a shaped article with high shape accuracy can be produced.

The shaping device may be provided with a plurality of types of first powders with different compositions (that is, may have a plurality of powder supply units that can store different types of first powders), and may have the capability of switching the first powder to be used. For example, when a plurality of powder layers 11 is layered, the composition of the powder may be changed for each layer.

Figure 1B:
Figure 2B:

(Step 2) Step of Placing the Second Powder at the Shaping Region of the Powder Layer In this step, a liquid 12 (also referred to as "particle-dispersed liquid 12") including the second powder that includes second particles 2 and has an average particle diameter of at least 1 nm and not more than 500 nm is applied to a shaping region S of the powder layer 11 with a liquid application device on the basis of slice data of the shaping object (FIGS. 1B and 2B). Here, the "shaping region S" refers to a region corresponding to the cross section of the shaping object (that is, a portion of the powder layer 11 that should be solidified and taken out as a shaped article). A region outside the shaping region S (that is, a portion from which the powder is to be finally removed) is referred to as a "non-shaping region N".

The second powder is a powder that can be sintered and melted at least at a lower temperature and/or over a shorter time than the first powder. In other words, when the mixed powder of the first powder and the second powder is heated, it is possible to set heating conditions (temperature, time, and the like) such that the second particles constituting the second powder are sintered together or melted while at least some of the first particles 1 constituting the first powder are not sintered together (and naturally not melted). Here, "sintering" refers to a treatment in which the particles are fixed (bonded) to each other by heating the powder at a temperature not higher than the melting point in a state where the particles are in contact with each other. Further, "not sintered" is inclusive of a state in which the particles are not fixed to each other and a state in which the particles are fixed with a weak force, and the boundary between particles fixed with a weak force can be confirmed with an electron microscope.

As will be described in detail hereinbelow, the shaping method of the present embodiment is characterized by that the heating is performed at a temperature at which the particles contained in the second powder are sintered together or melted, whereby the first particles 1 in the shaping region S are fixed to each other by the second particles 2, and the first powder in the non-shaping region N is thereafter removed.

The effect of using the second powder including the second particles 2 having an average particle diameter of at least 1 nm and not more than 500 nm is that the sintering or melting start temperature of the second powder sufficiently lower than the sintering start temperature of the first powder. According to the tests conducted by the present inventors, the sintering or melting start temperature of the second powder could be confirmed to be significantly reduced as compared with the sintering start temperature of the first powder including the first particles having an average particle diameter of at least 1 μm. The sintering start temperature of the second powder is preferably at least 100° C., and more preferably at least 300° C. lower than the sintering start temperature of the first powder.

The average particle diameter of the second particles 2 contained in the second powder is more preferably at least 1 nm and not more than 200 nm. Hereinafter, the second particles 2 may be referred to as nanoparticles 2.

The average particle diameter of not more than 200 nm is preferable because not only the sintering temperature is lowered, but also the dispersibility of the nanoparticles 2 in the liquid 12 is improved and the uniformity when the liquid 12 is applied is improved.

The average particle diameter of the nanoparticles 2 is smaller than the average particle diameter of the first particles 1. As a result, the nanoparticles 2 are filled in the gaps between the first particles 1, and the first particles 1 are easily fixed to each other by the nanoparticles 2.

The average particle diameter of the nanoparticles 2 may be set to a size that allows the nanoparticles 2 to easily enter the gaps between the first particles 1 when the liquid is applied.

As the nanoparticles 2, for example, resin particles, metal particles, ceramic particles, and the like can be used. Among these, where metal particles or ceramic particles are used as the first particles 1, it is preferable to use metal particles or ceramic particles as the nanoparticles 2. Examples of metals that can be used as the nanoparticles 2 include copper, tin, lead, gold, silver, platinum, palladium, iridium, titanium, tantalum, iron, and nickel. Further, a metal alloy such as a stainless alloy, a titanium alloy, a cobalt alloy, an aluminum alloy, a magnesium alloy, an iron alloy, a nickel alloy, a chromium alloy, a silicon alloy, or a zirconium alloy may be used as the nanoparticles 2.

Further, a material obtained by adding a nonmetallic element such as carbon to a metal such as carbon steel may be used as the nanoparticles 2.

Further, oxide ceramics may be used, and non-oxide ceramics may be used as the nanoparticles 2. Examples of oxide ceramics include metal oxides such as silica, alumina, zirconia, titania, magnesia, cerium oxide, zinc oxide, tin oxide, uranium oxide, barium titanate, barium hexaferrite, and mullite. Examples of non-oxide ceramics include silicon nitride, titanium nitride, aluminum nitride, silicon carbide, titanium carbide, tungsten carbide, boron carbide, titanium boride, zirconium boride, lanthanum boride, molybdenum silicide, iron silicide, barium silicide, and the like. The nanoparticles 2 may be composite particles of a plurality of types of metals or composite particles of a plurality of types of ceramics.

The nanoparticle 2 preferably includes at least one type of the same component as the first particle 1. As a result of including the same component, the surface of the nanoparticle 2 and the surface of the first particle 1 are easily bonded when the nanoparticle s 2 are sintered, and the first particle 1 can be firmly fixed. Furthermore, it is more preferable that the nanoparticle 2 be composed mainly of the component contained in the first particle 1. Where the final shaped article is a mixture of the first particles 1 and the nanoparticles 2 and the nanoparticles 2 are composed of the same component (material) as the first particles 1, the amount of impurities in the shaped article is reduced and the material of the shaped article is homogenized, so that the strength and quality of the shaped article can be improved. For example, when the first particle 1 is a stainless alloy including iron, iron particles, iron oxide particles, or the like can be suitably used as the nanoparticles 2.

As described above, where the composition of the first powder can be changed for each region or layer, the composition of the nanoparticles 2 and the type of the liquid 12 may be changed for each region or layer according to the composition of the first powder, or the same type of liquid 12 may be used for all layers and regions. Since the concentration and amount of the liquid 12 affect the porosity of the shaped article, the concentration and amount may be determined according to the required porosity of the shaped article.

It is preferable to provide a step of drying the liquid 12 between the step of applying the liquid 12 to the powder layer 11 and (Step 3). The step of drying the liquid 12 is preferably performed for each layer. The liquid 12 that is gradually concentrated as the drying proceeds gathers at the grain boundaries between the first particles 1 due to the surface tension of the liquid. As the liquid 12 moves, the nanoparticles 2 in the liquid selectively gather at the grain boundaries between the first particles 1 and aggregate. As a result of the drying process, the nanoparticles 2 are accumulated at the grain boundaries of the first particles 1, whereby the first particles 1 can be efficiently and firmly fixed during the sintering of the nanoparticles 2 described hereinbelow. In the drying of the liquid, it is preferable to select the optimum drying conditions such as temperature and time according to the concentration and amount of the liquid 12.

Further, in order to increase the uniformity of the liquid 12, a solvent may be added. As a specific solvent, an aqueous solvent, an organic solvent, or a mixed solvent of an aqueous solvent and an organic solvent can be used. As the aqueous solvent, pure water or the like can be used. As the organic solvent, alcohols such as methanol and ethanol, ketones such as methyl ethyl ketone, acetone and acetyl acetone, hydrocarbons such as hexane and cyclohexane, and the like are used. Where a solvent is added to the liquid 12, the solvent is evaporated at an appropriate speed during drying, and thus the nanoparticles 2 are unlikely to be unevenly dispersed.

An additive can be added, as appropriate, in order to control the dispersibility of the nanoparticles 2 in the liquid 12. The liquid 12 may include, as necessary, a functional substance such as a pigment.

The liquid 12 may also include a binder for fixing the particles. An existing substance can be used as the binder, but a substance decomposed by the heat treatment described hereinbelow (Step 3), that is, a substance having a decomposition temperature lower than the temperature at which the nanoparticles are sintered or melted is preferred. As a result of the decomposition by heating, the binder can be removed in (Step 3), while fixing the first particles 1 in the shaping region S and/or the nanoparticles 2 in the shaping region S before (Step 3), and is unlikely to become an impurity in the shaped article. Specific examples of the binder include resin materials and water-soluble carbohydrates. The binder is preferably soluble in the liquid.

Further, the application of the binder may be separated from the application step of the liquid 12, and a step of applying the binder to the powder layer 11 may be provided after (Step 2) and before (Step 3). In this case, the binder can be applied to the shaping region S and/or the non-shaping region N. By applying the binder, the first particles 1 can be temporarily fixed, and the formation of the next powder layer tends to be facilitated. In a preferred method for applying the binder, a liquid binder obtained by dissolving the binder in a liquid is applied using a liquid application device. A resin solution in which a resin material is dissolved in a solvent, a solution in which a water-soluble substance is dissolved in water, or the like can be used as the liquid binder.

It is preferable that the liquid 12 in which the nanoparticles are dispersed and the liquid including the binder be applied separately because each application device can be optimized independently according to the liquid to be applied, and therefore the devices are likely to have excellent durability.

The binder contributes to fixing the first particles 1 and/or the nanoparticles 2 in the shaping region S while performing (Step 2), and is decomposed and removed by heating in (Step 3). Accordingly, the binder applied in the shaping region S maintains the shape of the shaped article during (Step 2) and is decomposed by heat in (Step 3), and the decomposed product is removed through the gaps between the first particles. As a result, the binder is unlikely to remain as an impurity in the shaped article, and the first particles 1 in the non-shaping region N can be easily removed. It is preferable to determine the type and amount of the binder so that no binder remains.

Any device capable of applying the liquid in a desired amount at a desired position can be used as the liquid application device for applying the liquid 12 or the liquid binder. From the viewpoint of enabling accurate control of the liquid amount and the arrangement position, an inkjet device can be preferably used.

Where the liquid 12, which is a particle-dispersed liquid, and the liquid binder are separately applied, a configuration is preferred in which the application of the particle-dispersed liquid 12 and the application of the liquid binder to the shaping region S is performed once by an inkjet device having a head provided with nozzles for discharging respective liquids.

Where ejection is performed with an inkjet device, the viscosity of the liquid 12 needs to have an appropriate value, preferably not more than 50 cP, and more preferably not more than 20 cP. Meanwhile, in order to quickly diffuse the liquid 12 between the first particles 1 and to aggregate the liquid 12 between the first particles 1 during drying, it is necessary to set the viscosity of the liquid 12 to an appropriate value, and it becomes easier to control the discharge of a fluid composition where the viscosity is not more than 20 cP.

In order to increase the strength by increasing the volume density of the shaped article, it is preferable that the volume concentration of the nanoparticles 2 in the liquid 12 be higher within the above viscosity range. However, from the viewpoint of facilitating the accumulation of the nanoparticles 2 near the contact points between the first particles 1 in the process of drying the liquid 12, it is desirable that the volume concentration of the liquid 12 be lower. From these conditions, the volume concentration of the liquid 12 is preferably not more than 50 vol %, and more preferably not more than 30 vol %. The solid fraction concentration of not more than 50 vol % is preferable because the nanoparticles 2 tend to accumulate between the first particles 1 when the liquid 12 dries, and efficient contribution is made to the fixation of the first particles 1.

Further, the liquid 12 may be applied a plurality of times, and may be dried for every application. By applying the liquid a plurality of times, the concentration of the nanoparticles 2 in the powder layer 11 in the shaping region can be controlled.

Figure 1C:
Figure 1D:
Figure 1E:
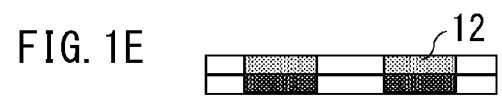
Figure 1F:
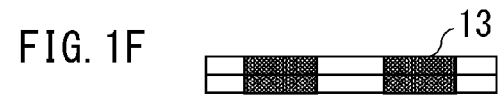
Figure 1G:
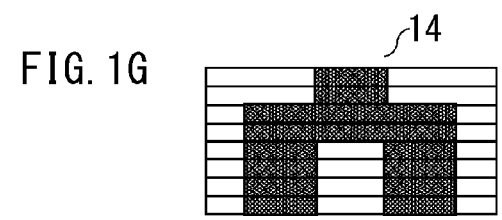
Figure 1H:
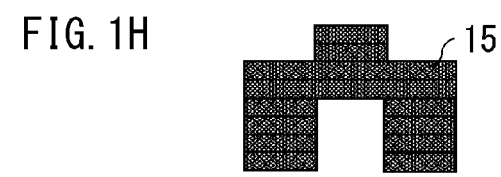
Figure 2C:
Figure 2D:
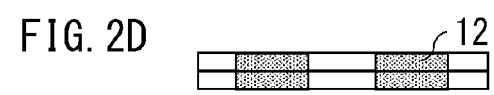
Figure 2E:
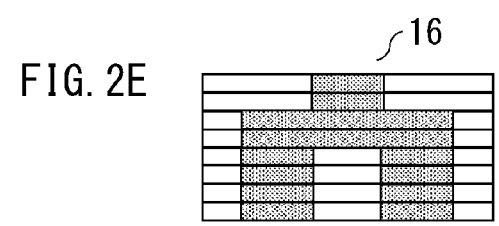
Figure 2F:
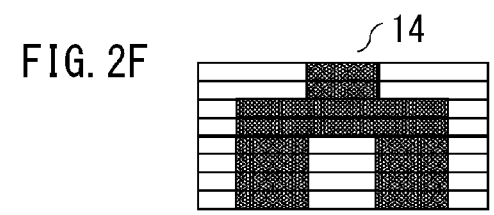

(Step 3) Step of Sintering or Melting the Second Powder and Fixing the First Particles to Each Other in the Shaping Region In this step, by heating the powder layer 11 under the condition that the second powder is sintered or melted, the first particles 1 in the shaping region S are fixed to each other through the nanoparticles 2 that are sintered or melted (FIGS. 1C, 1F, 2F).

In FIGS. 1C and 1F, the reference numeral 13 denotes a region where the particles are fixed. In the shaping process of FIGS. 1A to 1H, (Step 1) to (Step 3), that is, FIGS. 1D to 1F are repeated, and the powder layer is layered while fixing only the particles in the shaping region S, thereby forming a layered body 14 including the shaped article inside thereof. Further, in the shaping process of FIGS. 2A to 2G, (Step 1) and (Step 2), that is, FIGS. 2C to 2D are repeated, a powder layer in a state where the nanoparticles 2 are applied in the shaping region S is layered, and a layered body 16 composed of a plurality of powder layers is thereafter heated as a whole. In this shaping process, the layered body 14 which includes a shaped article inside thereof is also formed as in FIG. 1G. Before heating the layered body 16, a step of pressurizing the layered body 16 may be provided. This is because pressurizing the layered body 16 increases the number of contacts between the first particles 1, and the interparticle binding during heating tends to proceed efficiently.

The atmosphere during heating can be arbitrarily determined according to the type of material. For example, in the case of a metal, it is preferable to heat in an inactive gas such as Ar and N2 or in an atmosphere with less oxygen, such as a hydrogen gas atmosphere or a vacuum atmosphere, because oxidation of the metal during sintering can be suppressed.

In the process of Step 3, since the organic component and the resin can be removed by heat in a state in which the first particles are present around, the amount of the remaining carbon component in the shaped article can be reduced while maintaining the shape of the shaped article. In particular, even when shaping shapes having different thicknesses are co-present in the shaped article, the organic component and the resin component located inside can be removed, and therefore the degree of freedom in the shape of the shaped article is excellent.

Figure 2G:
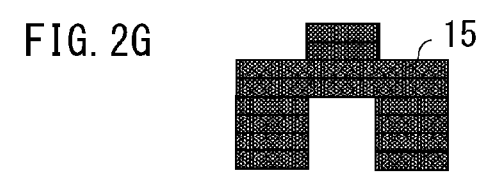

(Step 4) Step of Removing the First Particles Located Outside the Shaping Region In this step, the powder outside the shaping region S is removed from the layered body 14 obtained in (Step 3) to obtain a shaped article 15 (FIGS. 1F and 2G). Any method including a well-known method may be used for removing unnecessary powder from the layered body 14. For example, cleaning, air spraying, suction, vibration, etc. can be mentioned.

In the shaping method of the present embodiment, the first particles 1 contained in the powder to be removed are not fixed, or even if these particles are fixed, they are fixed weaker as compared to the shaping region S, and therefore can be removed very easily. Further, the removed powder can be collected and reused as a shaping material.

The shaping method of the present embodiment described above has the following characteristics.

Instead of bonding the first particles 1 that are the main shaping material to each other, the nanoparticles 2 are sintered or melted, and the first particles 1 that are present therearound are indirectly bonded by the bonding action of the nanoparticles 2. Therefore, the shape of the shaped article can be controlled by controlling the position and range in which the nanoparticles 2 are applied. Moreover, in order to apply the nanoparticles 2 in the state of the particle-dispersed liquid 12, the position, range, amount, etc., in which the nanoparticles 2 are applied can be easily and accurately controlled by using a liquid application device such as an inkjet device.

Since the nanoparticles 2 are sintered or melted, the first particles 1 can be firmly bonded to each other. Moreover, since the nanoparticles 2 act to fill the clearance gap between the first particles 1, the porosity of the shaped article can be reduced.

In (Step 3), the location where the nanoparticles 2 are present is selectively fixed, so that the particles in the non-shaping region N can be easily removed. Moreover, since it is not necessary to apply a large force when removing the particles in the non-shaping region N, there is little possibility that a shaped article will be broken or damaged.

Since the first particles 1 outside the shaping region S remain in the same form until just before (Step 4), where there is an overhang structure, the first particles 1 under the overhang structure can be used as a support body. As a result, deformation and cracking of the shaped article can be suppressed. Further, the first particles 1 used as a support body are easy to remove. Therefore, according to the shaping method of the present embodiment, shaping of complex shapes and fine shapes that have been difficult to shape with the conventional methods can be performed easily and with high quality by using materials such as metals and ceramics.

When the layered body 16 is formed as illustrated in FIGS. 2A to 2G and heated as a whole, the entire shaped article is heated uniformly. Accordingly, local thermal shock is reduced, and distortion and cracking during the formation of the shaped article are reduced.

Since shaping is possible without using a resin, shrinkage and deformation of the shaped article due to binder removal can be avoided. Further, as a result of not using a resin, or removing the resin in Step 2 when such is used, a shaped article with few impurities can be produced.

The above-described (Step 1) to (Step 4) are merely examples of basic steps in the shaping method of the present embodiment, and the scope of the present invention is not limited to the above-described contents. The specific processing content of each step described above may be changed as appropriate, or a step other than the steps described above may be added.

For example, after (Step 4), a step of heating the shaped article 15 at a temperature higher than the heating temperature in (Step 3) may be provided. By performing such additional heat treatment, the density of the shaped article 15 can be increased. In this case, the shaped article 15 may be heated under the conditions (heating temperature, heating time, etc.) at which the first particles 1 are sintered. By sintering the first particles 1 together, the characteristics of the shaped article 15 can be improved and the strength can be further increased. The shaped article 15 obtained by the method of the present embodiment is basically composed only of the shaping material (first particles 1 and nanoparticles 2), and may not include a binder such as a resin binder like the shaped article of the conventional method. Therefore, even if the shaped article 15 is additionally heated (sintered), the difference in composition of the shaped article 15 between before and after the heat treatment is small. Further, in the conventional method, the shape of the shaped article may change when the resin is removed by heat treatment. However, in the case of the shaped article 15 of the present embodiment, such a problem is unlikely to occur.

(Method for Producing Particles)

The first particles 1 and the nanoparticles 2 may be produced by any method including publicly known methods. For example, a gas atomization method and a water atomization method can be preferably used as a method for producing metal particles because substantially spherical particles can be obtained. In addition, a wet method such as a sol-gel method or a dry method in which a metal oxide liquefied in a high temperature air is cooled and solidified can be preferably used as a method for producing ceramic particles because substantially spherical particles can be obtained.

(Method for Producing Particle-Dispersed Liquid)

The particle-dispersed liquid 12 may be produced by any method including a known method as long as a large number of nanoparticles 2 can be dispersed in the solution. For example, the particle-dispersed liquid may be produced by adding the nanoparticles 2 to a solution and stirring.

EXAMPLES

Next, specific examples of the production method according to the above embodiment will be described.

<Preparation of Powder A>

A SUS powder (SUS316L, manufactured by Epson Atmix Corporation) including SUS particles having an average particle diameter of 7 μm is taken as a powder A.

<Preparation of Powder B>

A SUS powder (SUS316L, manufactured by LPW Technology Japan Co., Ltd.) including SUS particles having an average particle diameter of 30 μm is taken as a powder B.

<Preparation of Powder C>

A powder including SUS particles having an average particle diameter of 11 μm (SUS316L, manufactured by Sanyo Special Steel Co., Ltd.) is taken as a powder C.

<Preparation of Powder D>

A copper powder including copper particles having an average particle diameter of 8 μm (SFR-Cu, manufactured by Nippon Atomized Metal Powders Corporation) is taken as a powder D.

<Preparation of Solution A>

A solution A was obtained by dispersing 5.0 g of iron nanoparticle powder (manufactured by Sigma-Aldrich Co. LLC) having an average particle diameter of 25 nm in 45.0 g of ethanol (special grade, manufactured by Kishida Chemical Co., Ltd.). The volume concentration of the iron nanoparticles in the obtained solution A was 1.1 vol %. The solution A had a viscosity of 1.2 cP.

<Preparation of Solution B>

A solution B was obtained by adding 5.0 g of ethyl cellulose (STD-4, manufactured by Nisshin Kasei Co., Ltd.) to 45.0 g of ethanol (special grade, manufactured by Kishida Chemical Co., Ltd.), mixing, and then stirring at an ordinary temperature for 7 hours. The volume concentration of ethyl cellulose in the obtained solution B was 8.1 vol %. The solution B had a viscosity of 12.2 cP.

<Preparation of Solution C>

A solution C was obtained by adding 0.007 g of ethyl cellulose (STD-4, manufactured by Nisshin Kasei Co., Ltd.) to 0.493 g of ethanol (special grade, manufactured by Kishida Chemical Co., Ltd.), mixing, and then stirring at an ordinary temperature for 7 hours. The volume concentration of ethyl cellulose in the obtained solution C was 1.1 vol %.

<Preparation of Solution D>

Iron nanocolloid (H10, manufactured by Tateyama Machine Co., Ltd.) was used as a solution D. The solution D was obtained by dispersing an iron nanoparticle powder having an average particle diameter of 3.6 nm in n-hexane by using a surfactant to obtain a volume concentration of 0.9 vol %. The solution D had a viscosity of 0.5 cP.

<Preparation of Solution E>

Silver ink (NBSIJ-KC01, manufactured by Mitsubishi Paper Mills Limited.) in which silver nanoparticles were dispersed in water was taken as a solution E. The solution E included silver nanoparticles having an average particle diameter of 34 nm, and the volume concentration was 0.8 vol %. The viscosity was 4.0 cP.

<Preparation of Solution F>

A nickel nanoparticle aqueous dispersion having an average particle diameter of 160 nm and prepared by a liquid phase reduction method was taken as a solution F. The volume concentration of nickel nanoparticles in the obtained solution F was 0.6 vol %. The viscosity was 7.1 cP.

<Measurement of Sintering Start Temperature>

The firing start temperature of each powder was obtained by the following procedure.

An alumina container with a diameter of 5 mm and a height of 2.5 mm was packed with an amount of powder such that the bottom was not visible. The alumina container was heated in an electric furnace for 60 minutes, and the state of the powder was observed. When the sintering of the powder could not be confirmed, heating was further performed under a condition where the temperature was increased by 10° C., the observation was repeated, and the temperature at which the sintering of the powder was confirmed was taken as the sintering start temperature of the powder.

Whether the powder was sintered was confirmed by the following method.

The magnification of a field of view in an electron microscope was determined such that at least two particles having an average particle diameter and contained in the powder before the heat treatment were generally accommodated in the field of view, and the SUS particles contained in the powder after the heat treatment were observed at at least 30 places at the aforementioned magnification.

When particles with an about average particle diameter (not more than the average particle diameter) were bonded in at least half of the observation fields and the particles were fixed (bonded) until the boundary between the original particles could no longer be observed, it was determined that the powder was sintered.

The same test was performed on the powder of iron nanoparticles having an average particle diameter of 25 nm (manufactured by Sigma-Aldrich Co. LLC) and the sintering start temperature was acquired. The sintering start temperature of the iron nanoparticle powder was not more than 500° C. which was significantly lower than the sintering start temperature 800° C. of the powder (powder B) of SUS316L (melting point 1,400° C.) having a melting point lower than that of iron (melting point 1,538° C.). When the solution D was dried and the same test was performed on the silver nanoparticles, the sintering start temperature was not more than 300° C.

Hereinafter, examples will be described in which shaped articles having a desired shape were produced by applying the solution A, the solution B, or the solution D to the powder layer formed of the powder A or the powder B and performing heat treatment.

Example 1

Figure 4:
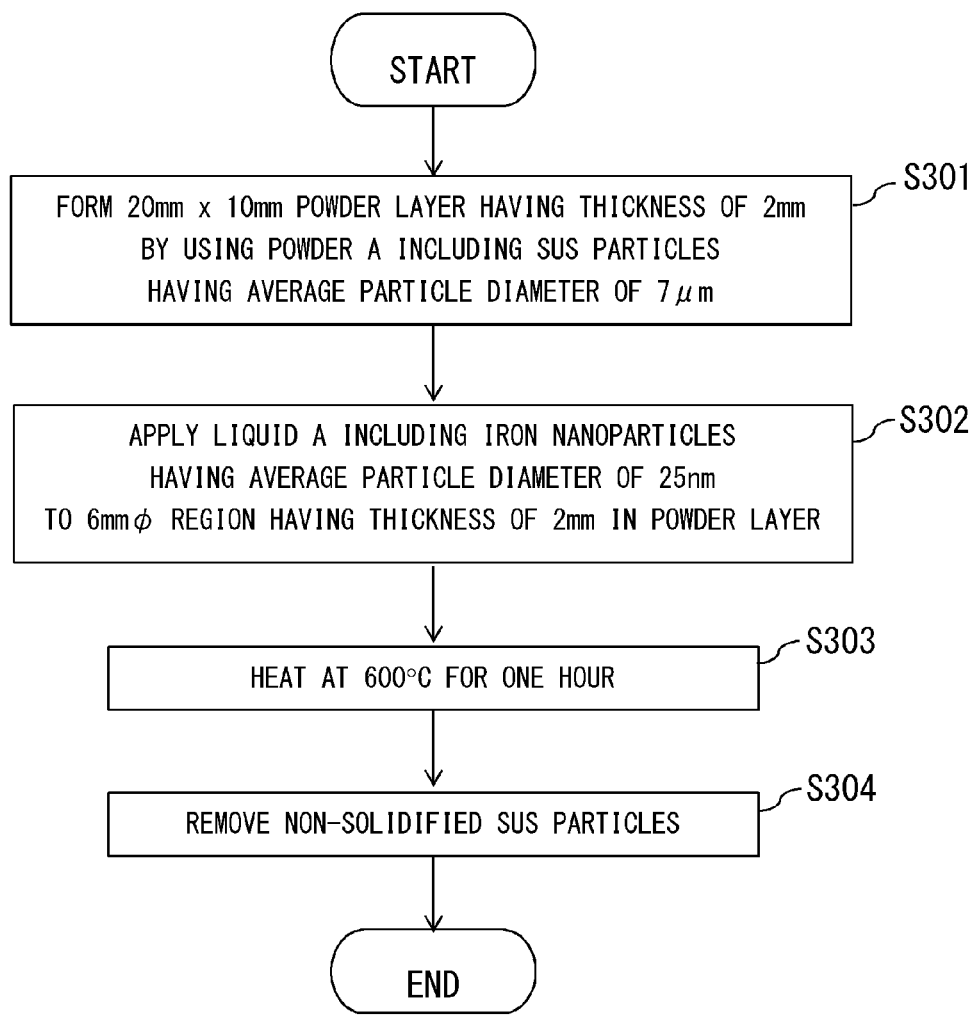
FIG. 4 illustrates a flow of a shaping method according to Example 1.

The example will be described with reference to FIG. 4.

A 20 mm×10 mm powder layer having a thickness of 2 mm was formed on the alumina substrate by using the powder A (step S301), and the solution A was then applied to a 6 mmΦ region so as to have a penetration depth of 2 mm (step S302). The obtained powder layer was put into an electric furnace and heat-treated for one hour at 600° C. which is a temperature that is at least the sintering start temperature of the iron nanoparticle powder and less than the sintering start temperature of the SUS particle powder (step S303). Of the powder layer after the heat treatment, the SUS particles in the portion to which the solution A was applied (corresponding to the shaping region S) were solidified by the iron nanoparticles. By removing the SUS particles in the portion to which the solution A was not applied (corresponding to the non-shaping region N) (step S304), a plate-shaped shaped article could be obtained.

Example 2

Figure 5:
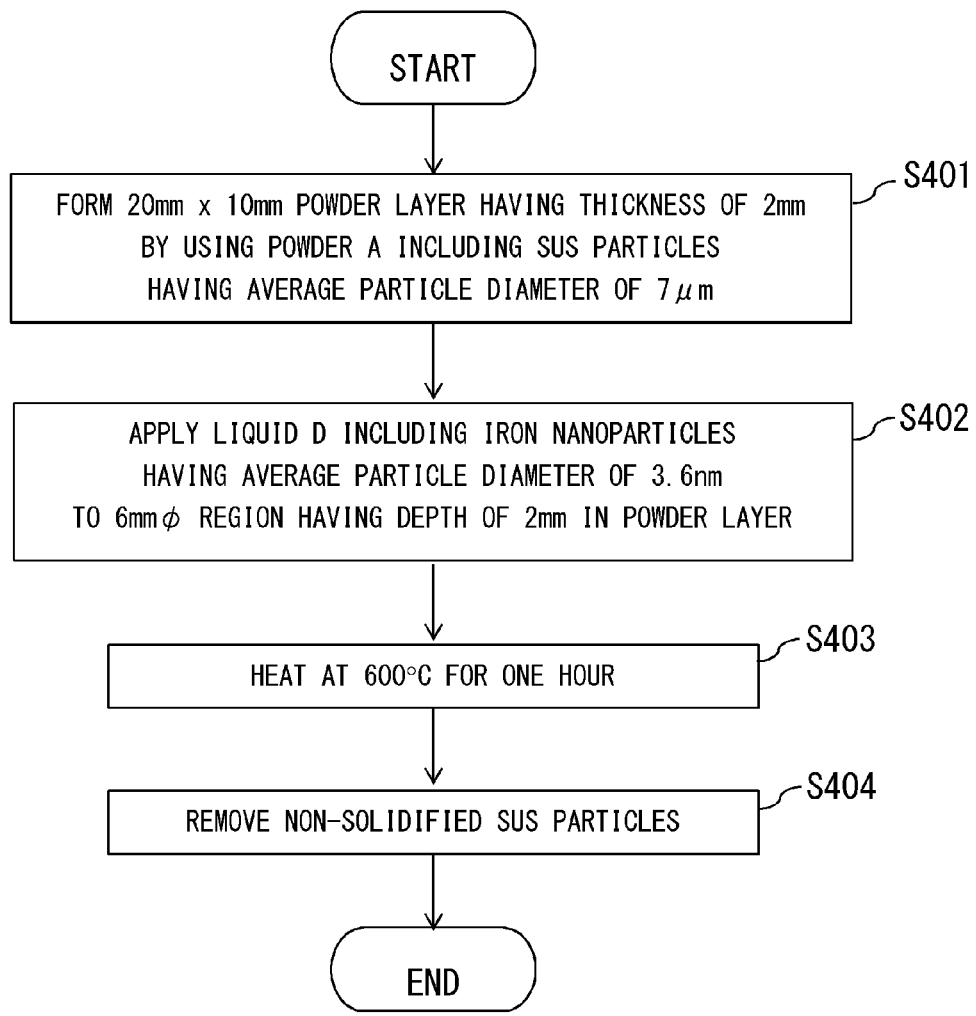
FIG. 5 illustrates a flow of a shaping method according to Example 2.

Referring to FIG. 5, a 20 mm×10 mm powder layer having a thickness of 2 mm was formed on the alumina substrate by using the powder A (step S401), and the solution D was then applied to a 6 mmΦ region so as to obtain a penetration depth of 2 mm (step S402). The obtained powder layer was put into an electric furnace and heat-treated for one hour at 600° C. which is a temperature that is at least the sintering start temperature of the iron nanoparticle powder and less than the sintering start temperature of the SUS particle powder (step S403). Of the powder layer after the heat treatment, the SUS particles in the portion to which the solution D was applied (corresponding to the shaping region S) were solidified by the iron nanoparticles. By removing the SUS particles in the portion to which the solution D was not applied (corresponding to the non-shaping region N) (step S404), a plate-shaped shaped article could be obtained.

Example 3

Figure 6:
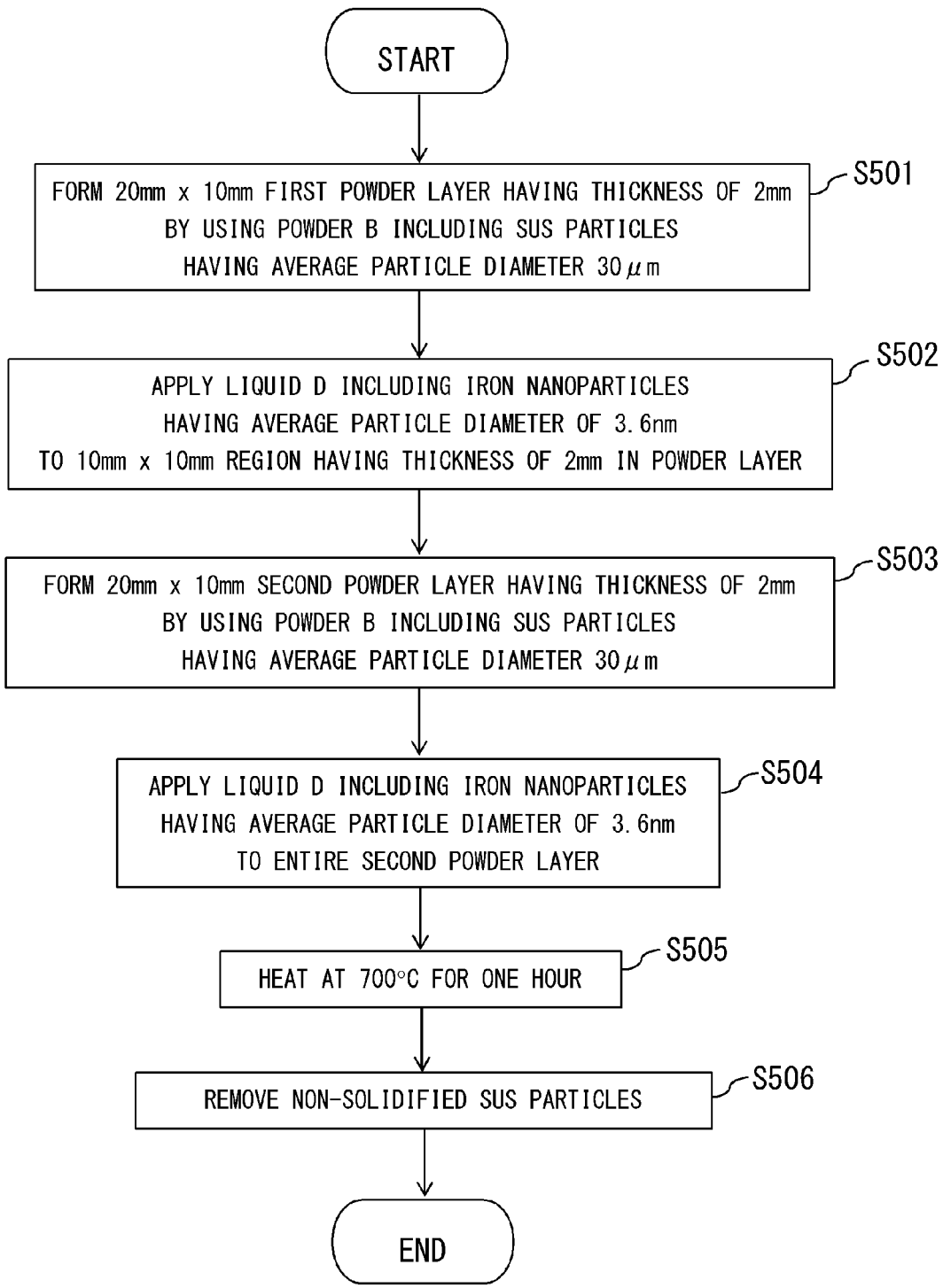
FIG. 6 illustrates a flow of a shaping method according to Example 3.

Referring to FIG. 6, a 20 mm×10 mm first powder layer having a thickness of 2 mm was formed using the powder B (step S501), and the solution D was then applied to a 10 mm×10 mm region (step S502). Then, a 20 mm×10 mm second powder layer having a thickness of 2 mm was formed using the powder B on the first powder layer (step S503), and the solution D was then applied to the entire second powder layer so as to obtain a penetration depth of 2 mm (step S504), thereby obtaining a layered body. The obtained layered body was put into an electric furnace and heat-treated for one hour at 700° C. which is a temperature that is at least the sintering start temperature of the iron nanoparticle powder and less than the sintering start temperature of the SUS particle powder (step S505). Of the layered body after the heat treatment, the SUS particles in the portion to which the solution D was applied (corresponding to the shaping region S) were solidified by the iron nanoparticles. By removing the SUS particles in the portion to which the solution D was not applied (corresponding to the non-shaping region N) (step S506), a desired shaped article could be obtained. The obtained shaped article had an overhang structure in which the second layer was larger than the first layer.

Example 4

Shaping was performed in the same procedure as in Example 3. First, a 20 mm×10 mm first powder layer having a thickness of 2 mm was formed using the powder B, and the solution F was then applied to a 10 mm×10 mm region. Then, a 20 mm×10 mm second powder layer having a thickness of 2 mm was formed using the powder B on the first powder layer, and the solution F was then applied to the entire second powder layer so as to have a penetration depth of 2 mm, thereby obtaining a layered body. The obtained layered body was put into an electric furnace and heat-treated for one hour at a temperature of 700° C. which is at least the sintering start temperature of the iron nanoparticle powder and less than the sintering start temperature of the SUS particle powder. Of the layered body after the heat treatment, the SUS particles in the portion to which the solution F was applied (corresponding to the shaping region S) were solidified by the iron nanoparticles. By removing the SUS particles in the portion to which the solution F was not applied (corresponding to the non-shaping region N), a desired shaped article could be obtained. The obtained shaped article had an overhang structure in which the second layer was larger than the first layer.

According to Examples 1 to 4, it was confirmed that by applying iron nanoparticles to the desired region of the powder layer formed of powder composed of SUS particles and sintering the iron nanoparticles it was possible to obtain a shaped article composed of SUS particles and having a desired shape.

As a comparative example, shaping was performed by solidifying a powder with a conventional resin binder.

Comparative Example 1

A 20 mm×10 mm first powder layer having a thickness of 2 mm was formed using the powder B, and the solution B was then applied to a 10 mm×10 mm region. Then, a 20 mm×10 mm second powder layer having a thickness of 2 mm was formed using the powder B on the first powder layer, and the solution B was then applied to the entire second powder layer so as to obtain a penetration depth of 2 mm, thereby obtaining a layered body which was a resin-metal composite body. After removing the powder B in the region to which the solution B was not applied from the obtained layered body, the layered body was placed in an electric furnace and heated at a temperature which was at least the sintering start temperature of the SUS particles to obtain a shaped article.

In this method, when the powder B in the region to which the solution B was not applied was removed, a part of the resin-metal composite was broken. Further, breakage was also confirmed even in a part of the finally obtained metal shaped article, and warpage was confirmed in a part of the shaped article. In this method, an overhang structure could not be formed, and a desired shaped article could not be obtained.

Comparative Example 2

A 20 mm×10 mm first powder layer having a thickness of 2 mm was formed using the powder B, and the solution B was then applied to a 10 mm×10 mm region. Then, a 20 mm×10 mm second powder layer having a thickness of 2 mm was formed using the powder B on the first powder layer, and the solution B was then applied to the entire second powder layer so as to have a penetration depth of 2 mm, thereby obtaining a layered body which was a resin-metal composite body. The obtained layered body was placed in an electric furnace and heated for one hour at a temperature which was at least the decomposition temperature of ethyl cellulose and less than the sintering start temperature of the SUS particles. The layered body after the heat treatment was still in a powder state (a state in which particles were not bonded to each other), and a desired shaped article could not be obtained.

Comparative Example 3

A 20 mm×10 mm first powder layer having a thickness of 2 mm was formed using the powder B, and the solution B was then applied to a 10 mm×10 mm region. Then, a 20 mm×10 mm second powder layer having a thickness of 2 mm was formed using the powder B on the first powder layer, and the solution B was then applied to the entire second powder layer so as to obtain a penetration depth of 2 mm, thereby obtaining a layered body which was a resin-metal composite body. The obtained layered body was placed in an electric furnace and heated for one hour at a temperature which was at least the sintering start temperature of the SUS particles. The SUS particles in both the region to which the solution B was applied and the region to which the solution B was not applied were sintered, a metal sintered body was formed in the entire layered body, and a desired shaped article was not obtained.

Comparative Example 4

A 20 mm×10 mm first powder layer having a thickness of 2 mm was formed using the powder B, and the solution D was then applied to a 10 mm×10 mm region. Then, a 20 mm×10 mm second powder layer having a thickness of 2 mm was formed using the powder B on the first powder layer, and the solution D was then applied to the entire second powder layer so as to have a penetration depth of 2 mm, thereby obtaining a layered body. The obtained layered body was placed as is in an electric furnace and heated for one hour at a temperature lower than the sintering start temperature of the SUS particles. The layered body after the heat treatment was still in a powder state (a state in which particles were not bonded to each other), and a desired shaped article could not be obtained.

Example 5

A first powder layer having a diameter of 15 mmφ and a thickness of 400 μm was formed using the powder B, and the solution E was thereafter discharged using an inkjet head to draw a circular pattern having a diameter of 15 mmφ.

Next, a second powder layer having a diameter of 15 mmφ and a thickness of 400 μm was formed on the first powder layer by using the powder B, and the solution E was discharged on the second powder layer by using an inkjet head to draw a character pattern and obtain a layered body.

The obtained layered body was put in an electric furnace and heat-treated for 3 hours at a temperature of 650° C. which was at least the sintering start temperature of silver nanoparticles and lower than the sintering start temperature of SUS particles.

In the layered body after the heat treatment, the SUS particles in the portion to which the solution E was applied (corresponding to the shaping region S) were solidified by the silver nanoparticles.

The desired shaped article could be obtained by removing the SUS particles in the portion to which the solution E was not applied (corresponding to the non-shaping region N).

Example 6

A first powder layer having a diameter of 15 mmφ and a thickness of 400 μm was formed using the powder D, and the solution E was thereafter discharged using an inkjet head to draw a circular pattern having a diameter of 15 mmφ.

Next, a second powder layer having a diameter of 15 mmφ and a thickness of 400 μm was formed on the first powder layer by using the powder D, and the solution E was discharged on the second powder layer by using an inkjet head to draw a character pattern and obtain a layered body.

The obtained layered body was put in an electric furnace and heat-treated for one hour at a temperature of 300° C. which was at least the sintering start temperature of silver nanoparticles and lower than 400° C. which was the sintering start temperature of copper particles.

In the layered body after the heat treatment, the copper particles in the portion to which the solution E was applied (corresponding to the shaping region S) were solidified by the silver nanoparticles.

The desired shaped article could be obtained by removing the copper particles in the portion to which the solution E was not applied (corresponding to the non-shaping region N).

Example 7

A powder layer having a thickness of 200 μm was formed using the powder C, the solution E was thereafter discharged using an inkjet head, and two 2.5 mm×25 mm rectangular patterns were drawn horizontally at an interval of 7 mm. The step of forming a powder layer on the powder layer and the discharging step of the solution E were repeated 11 times so that the rectangular patterns overlapped on the powder layer.

Subsequently, a step of rotating the drawing pattern by 85° about the center between the rectangles and similarly drawing a pattern with the solution E and the powder layer forming step were repeated 12 times.

Likewise, a step in which the step of rotating the drawing pattern by 85° and drawing a pattern with the solution E and the powder layer forming step were repeated 12 times was repeated twice to obtain a layered body.

The obtained layered body was put in an electric furnace and heat-treated for 1.5 hours at a temperature 650° C. which was at least the sintering start temperature of silver nanoparticles and lower than the sintering start temperature of SUS particles.

In the layered body after the heat treatment, the SUS particles in the portion to which the solution E was applied (corresponding to the shaping region S) were solidified by the silver nanoparticles.

The desired shaped article could be obtained by removing the SUS particles in the portion where the solution E was not applied (corresponding to the non-shaping region N). The obtained shaped article was further heated for one hour at 1,300° C., which was at least the sintering start temperature of SUS particles, in an atmosphere of Ar 97% and hydrogen 3%.

The obtained shaped article had an overhang structure composed of a plurality of rectangular parallelepipeds. Moreover, the strength was higher than before heating at 1,300° C. due to sintering of the SUS particles.

From the examples and comparative examples described above, it can be understood that according to the shaping method of the present embodiment, a shaped article including a complex shape such as an overhang structure can be easily produced without forming a support body. Subsequently, further embodiments of the shaping method and the shaping device of the present invention will be described.

Example 8

Figure 7:
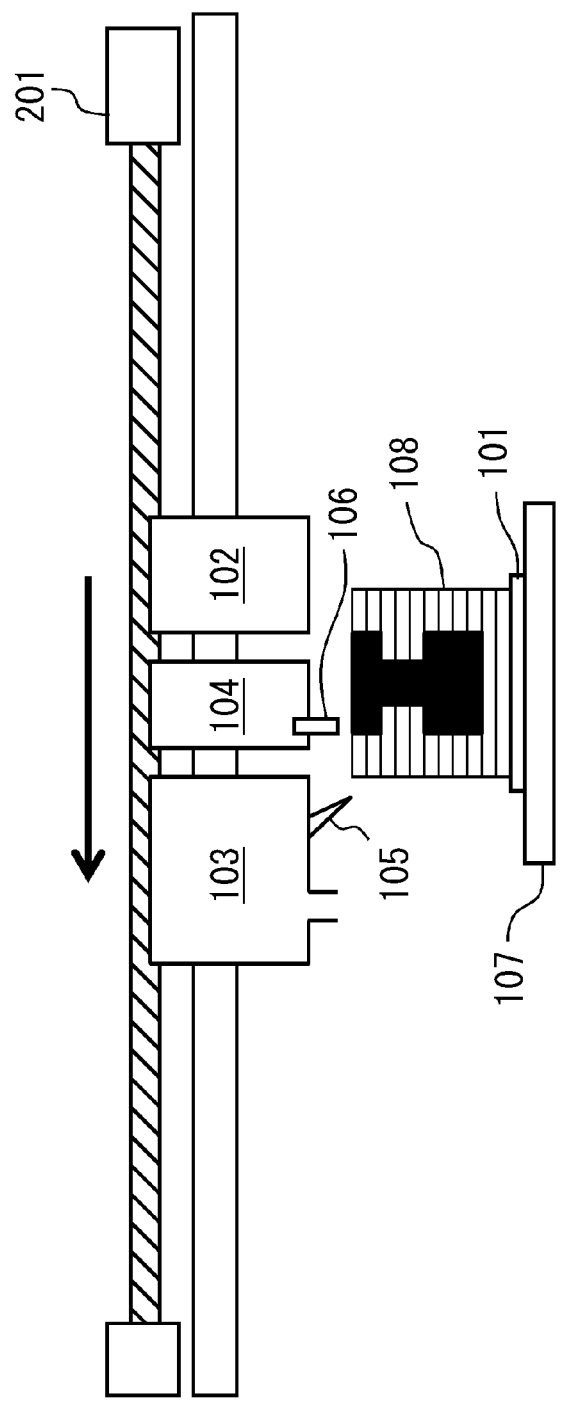
FIG. 7 schematically illustrates a shaping device according to Example 8.

FIG. 7 illustrates a shaping device according to Example 8. This shaping device includes a powder supply unit 103 that accommodates and supplies powder, a layer thickness regulating blade 105, a liquid supply unit 104 that accommodates a particle-dispersed liquid, a liquid application unit 106 that applies the particle-dispersed liquid, and a heater 102 for heating a powder layer. The powder supply unit 103, the layer thickness regulating blade 105, the liquid supply unit 104, the liquid application unit 106, and the heater 102 are provided at a movable head. Further, the shaping device also includes a drive mechanism 201 that moves the head in the direction of the arrow in FIG. 7 and a stage 107 on which a shaped article being produced is arranged and which is movable up and down. Although only the stage 107 is illustrated in FIG. 7, the powder layer is formed in a container having a wall surface (not illustrated) with a height from the stage that can be changed depending on the amount of powder. The same applies to Examples 9 to 15 hereinbelow. The drive mechanism 201 is configured of, for example, a ball screw and a motor. Although FIG. 7 illustrates the uniaxial drive mechanism 201, a multi-axis drive mechanism may be provided so that the head could be scanned in multiple directions. For example, an inkjet device can be preferably used as the liquid application unit 106. In this embodiment, the powder supply unit 103 and the layer thickness regulating blade 105 constitute a powder layer forming means configured to form a powder layer by using the first powder, and the liquid supply unit 104 and the liquid application unit 106 constitute an application means configured to apply the second powder to the powder layer. Further, the heater 102 constitutes a heating means configured to heat the powder layer.

Before starting shaping, the first powder composed of the first particles 1 is accommodated in the powder supply unit 103, and the particle-dispersed liquid including the second powder (second particles 2) is accommodated in the liquid supply unit 104. Further, a base substrate 101 is set on the stage 107. Subsequently, the first powder is supplied from the powder supply unit 103 onto the base substrate 101, and the surface of the first powder is leveled by the layer thickness regulating blade 105, whereby a powder layer of the first powder having a thickness of 100 µm is formed on the base substrate 101. This powder layer is a layer underlying a layered body 108 and is hereinafter referred to as a "base layer".

Next, based on the thickness defined by the slice data, the amount of the first powder for one layer is supplied from the powder supply unit 103 onto the base layer, and the powder surface is leveled by the layer thickness regulating blade 105 to form a powder layer of the first powder. A powder layer for one slice of a shaped article is thus formed.

Next, using the liquid application unit 106, the solution A is applied to the shaping region S in the powder layer based on the cross-sectional shape of the shaping object defined by the slice data. The amount of liquid at this time is controlled so that the particle-dispersed liquid in which the second powder is dispersed penetrates to a depth substantially equal to the thickness of the powder layer. As a result, a powder layer in which the second particles 2 have entered the gaps between the first particles 1 in the shaping region S is formed. Next, the powder layer is heated using the heater 102 under the conditions such that at least some of the first particles are not sintered to each other, but the second particles are sintered or melted, and the first particles are fixed to each other by the sintered or melted second particles.

A layered body 108 in which a plurality of powder layers is stacked is produced by repeating a series of processes such as formation of the powder layer of the first powder, application of the particle-dispersed liquid, and heating of the powder layer for each layer on the basis of the slice data of each layer. Thereafter, the first powder in the non-shaping region N is removed from the layered body 108, whereby a shaped article having a desired shape is obtained.

With the shaping device of the present embodiment, a shaped article including an overhang structure, a fine structure or the like can be produced with high quality. In addition, since a series of processes of forming the powder layer with the first powder, arranging the second powder, and heating the powder layer can be implemented in one scan, high-speed shaping is possible, and the shaping device can be reduced in size. Further, since the base layer is laid between the base substrate 101 and the shaped article, no special processing for removing the shaped article from the base substrate 101 is required.

Example 9

Figure 8:
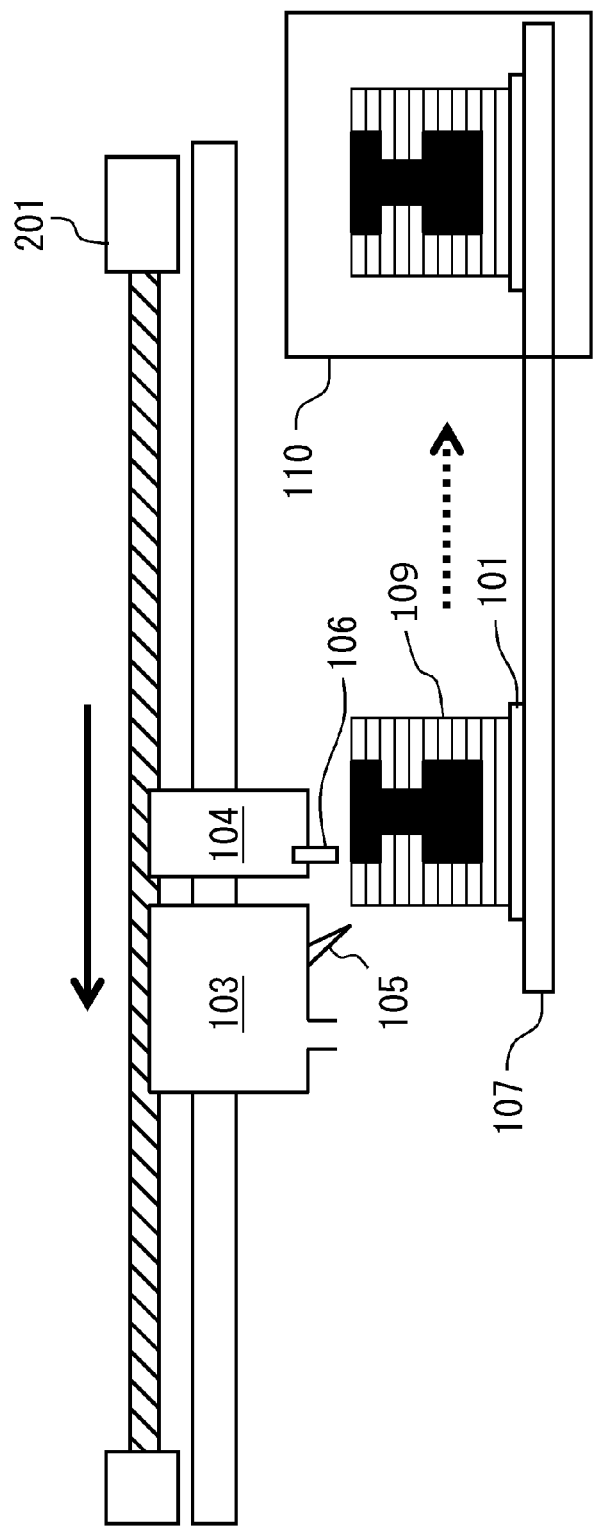
FIG. 8 schematically illustrates a shaping device according to Example 9.

FIG. 8 illustrates a shaping device according to Example 9. The difference in configuration from Example 8 is that instead of providing the heater 102, a heating area (heating chamber) 110 for heating the entire layered body is provided.

In the same manner as in Example 8, a base layer having a thickness of 100 µm is formed on the base substrate 101. Next, based on the thickness defined by the slice data, the amount of the first powder for one layer is supplied from the powder supply unit 103 onto the base layer, and the powder surface is leveled by the layer thickness regulating blade 105 to form a powder layer. A powder layer for one slice of a shaped article is thus formed. Next, using the liquid application unit 106, a particle-dispersed liquid in which the second powder is dispersed is applied to the shaping region S in the powder layer based on the cross-sectional shape of the shaping object defined by the slice data. The amount of liquid at this time is controlled so that the particle-dispersed liquid penetrates to a depth substantially equal to the thickness of the powder layer. As a result, a powder layer in which the second particles 2 have entered the gaps between the first particles 1 in the shaping region S is formed.

A layered body 109 in which a plurality of powder layers is stacked is produced by repeating the formation of the powder layer composed of the first powder (first particles) and the application of the particle-dispersed liquid including the second powder (second particles). Then, the layered body 109 is moved to the heating area 110, and the layered body 109 is heated under the conditions such that at least some of the first particles are not sintered, but the second particles are sintered or melted. As a result, the second particles are sintered, and the first particles in the shaping region S are fixed to each other by the sintered or melted second particles. Thereafter, the first powder in the non-shaping region N is removed from the layered body 109, whereby a shaped article having a desired shape is obtained.

With the shaping device of the present embodiment, a shaped article including an overhang structure, a fine structure or the like can be produced with high quality. Further, since the entire layered body 109 is heated, rather than each layer, the entire layered body 109 can be heated uniformly during the heat treatment, local thermal shocks are reduced, and distortion and cracking during formation of the shaped article are suppressed. In addition, since a series of processes of forming the powder layer composed of the first particles 1 and arranging the second particles 2 can be performed by one scan, high-speed shaping is possible and the shaping device can be reduced in size. In addition, since the number of heat treatment operations can be significantly reduced as compared with the case where the heat treatment is performed for each layer, the shaping time can be shortened. Furthermore, since the base layer is laid between the base substrate 101 and the shaped article, no special processing is required for removing the shaped article from the base substrate 101.

Example 10

In Example 10, the particle-dispersed liquid including the second powder (second particles) is applied to the powder layer and then allowed to stand for 1 minute, whereby ethanol of the solution A is dried. Other shaping processes may be the same as those in Example 8 or Example 9. Further, the configuration of the shaping device also may be the same as in Example 8 or Example 9. Since the penetration of the particle-dispersed liquid can be controlled by providing the drying step, it is possible to produce a shaped article with higher accuracy than in the above-described embodiments. Further, as a result of providing the drying step, the second particles 2 accumulate at the grain boundaries of the first particles 1, thereby making it possible to produce a shaped article having higher strength than in the above-described embodiments.

Example 11

Figure 9:
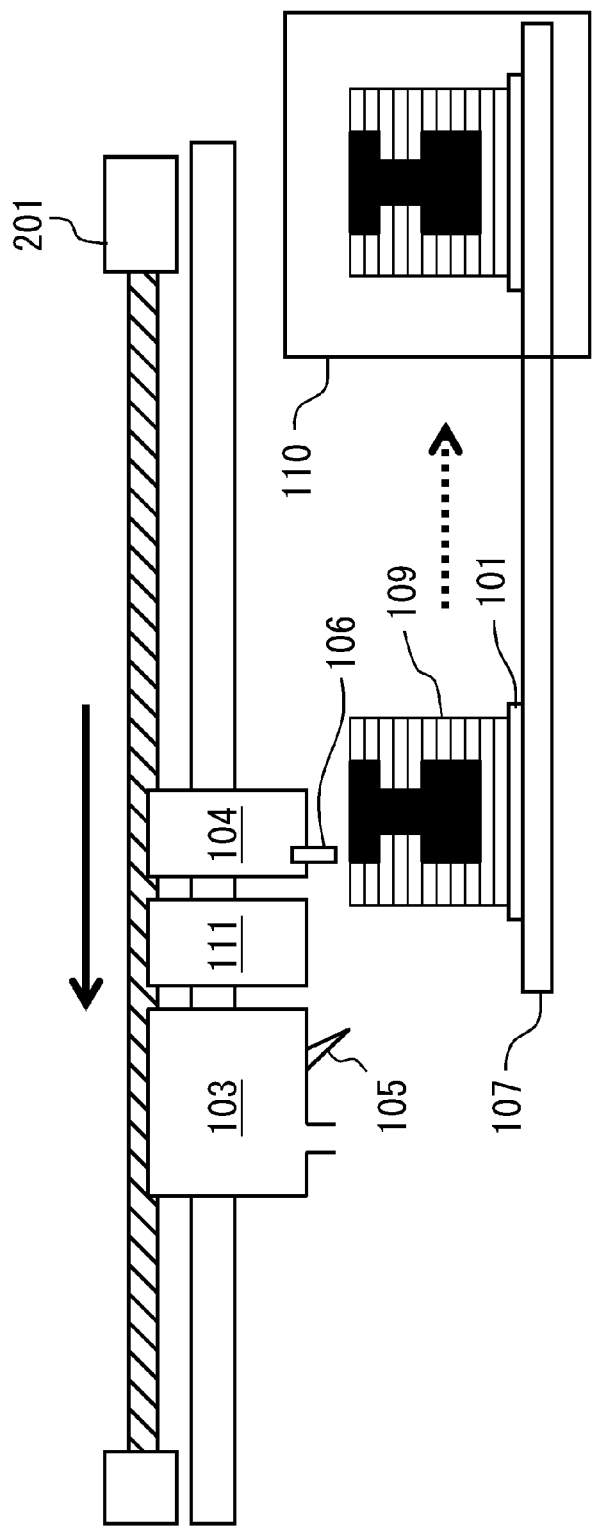
FIG. 9 schematically illustrates a shaping device according to Example 11.

FIG. 9 illustrates a shaping device according to Example 11. The difference in configuration from Example 9 is that a drying heater 111 is provided between the powder supply unit 103 and the liquid application unit 106. The drying heater 111 is a drying assist means configured to accelerate the drying of the particle-dispersed liquid including the second powder (second particles) applied to the powder layer. In the present embodiment, after the powder layer is formed, the powder layer is heated by the drying heater 111. Thereafter, the particle-dispersed liquid A is applied to the heated powder layer. With such a configuration, the drying of the solvent contained in the particle-dispersed liquid is accelerated as compared to the natural drying as in Example 10, the drying time can be shortened and the shaping time can be shortened. In FIG. 9, the drying assist means is provided before the liquid application unit 106, but the drying assist means (a heater or the like) may be provided after the liquid application unit 106.

Example 12

Figure 10:
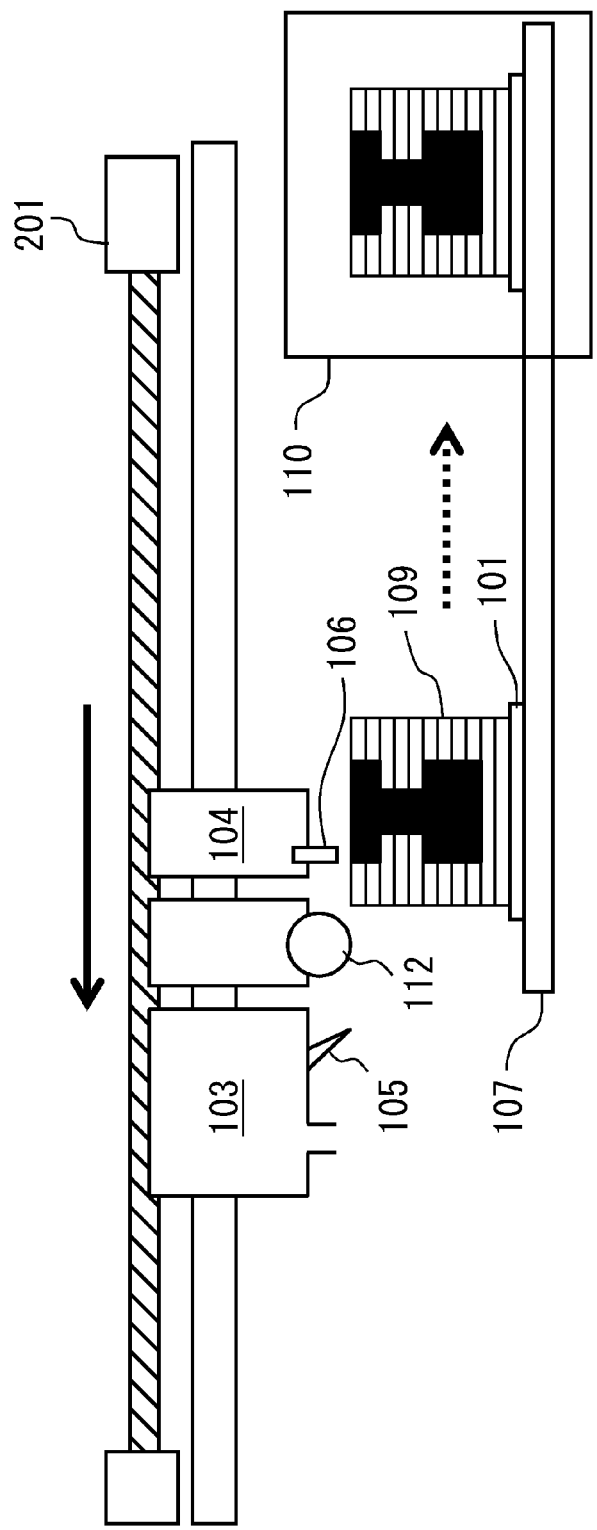
FIG. 10 schematically illustrates a shaping device according to Example 12.

FIG. 10 illustrates a shaping device according to Example 12. The difference in configuration from Example 9 is that a pressurizing means 112 is provided between the powder supply unit 103 and the liquid application unit 106. A pressurizing roller as illustrated in FIG. 10 or a pressurizing plate may be used as the pressurizing means 112. In this example, after the powder layer of the first powder is formed, the powder layer is pressurized by the pressurizing means 112. As a result of pressurizing the powder layer, the particles of the first powder come into close contact with each other, so that the porosity and defects of the shaped article can be reduced and the mechanical strength of the shaped article can be increased.

Example 13

In Example 13, a shaped article (an object from which unnecessary particles have been removed) is placed in the heating area 110, and the shaped article is heated under conditions where SUS particles can be sintered. As a result, sintering of the SUS particles which are the main material of the shaped article is advanced, and therefore pores of the shaped article are reduced and the mechanical strength of a shaped article can be further increased.

Example 14

Figure 11:
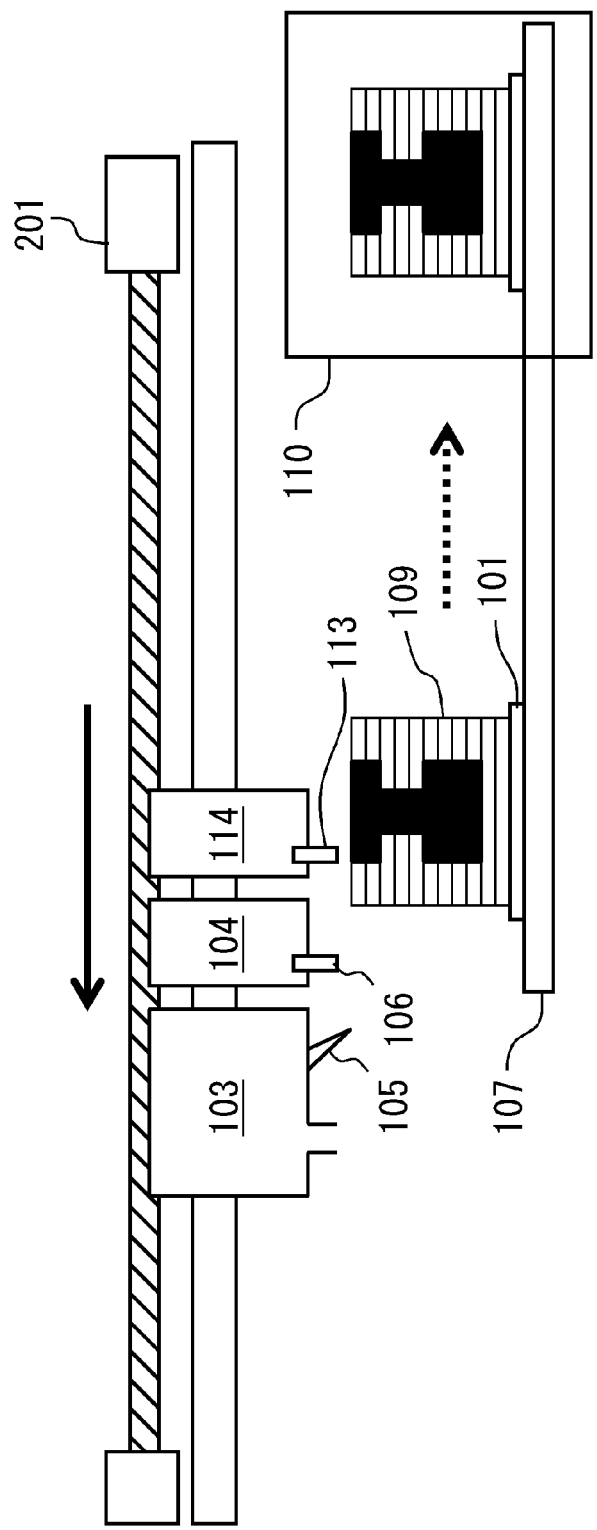
FIG. 11 schematically illustrates a shaping device according to Example 14.

FIG. 11 illustrates a shaping device according to Example 14. The difference in configuration from Example 9 is that a second liquid application unit 113 for discharging a binder is provided after the liquid application unit 106 that discharges the second powder-dispersed liquid.

Before starting shaping, the first powder composed of the first particles 1 is accommodated in the powder supply unit 103, the solution including the second particles 2 (nanoparticles) is accommodated in the liquid supply unit 104, and the solution which is a liquid binder including the resin binder is accommodated in the liquid supply unit 114.

In the same manner as in Example 9, a base layer having a thickness of 100 μm is formed on the base substrate 101. Next, based on the thickness defined by the slice data, the amount of the first powder for one layer is supplied from the powder supply unit 103 onto the base layer, and the powder surface is leveled by the layer thickness regulating blade 105 to form a powder layer of the first powder. A powder layer for one slice of a shaped article is thus formed.

Next, using the liquid application unit 106, the solution including the second powder is applied to the shaping region S in the powder layer based on the cross-sectional shape of the shaping object defined by the slice data. The amount of liquid at this time is controlled so that the solution penetrates to a depth substantially equal to the thickness of the powder layer. As a result, nanoparticles (second particles 2) enter the gaps between the first particles 1 in the shaping region S.

Next, the liquid application unit 113 is used to apply the solution C to the powder layer. As a result, the first particles 1 are temporarily fixed with the binder.

Based on the slice data of each layer, the formation of the powder layer of the first powder and the application of the solution C are repeated for each layer, thereby producing a layered body 109 in which a plurality of powder layers is stacked. Thereafter, the layered body 109 is moved to the heating area 110, and the layered body 109 is heated under the conditions such that at least some of the first particles are not sintered, but the nanoparticles are sintered or melted. As a result, the nanoparticles are sintered or melted, and the first particles are fixed to each other by the sintered or melted nanoparticles. Thereafter, the first particles in the non-shaping region N are removed from the layered body 109, whereby a shaped article having a desired shape is obtained.

In this embodiment, since the first particles of the powder layer are also fixed to each other by ethyl cellulose, molding and layering of the powder layers can be performed with high accuracy, and defects in the shaped article are reduced. In addition, since the decomposition temperature of ethyl cellulose is lower than the sintering start temperature of the nanoparticles, ethyl cellulose is decomposed during heating.

Further, by independently applying the solution including the nanoparticles and the solution including the binder, each of the liquid application units 106 and 113 can be optimized independently, so that excellent durability of the liquid application unit is achieved.

Example 15

Figure 12:
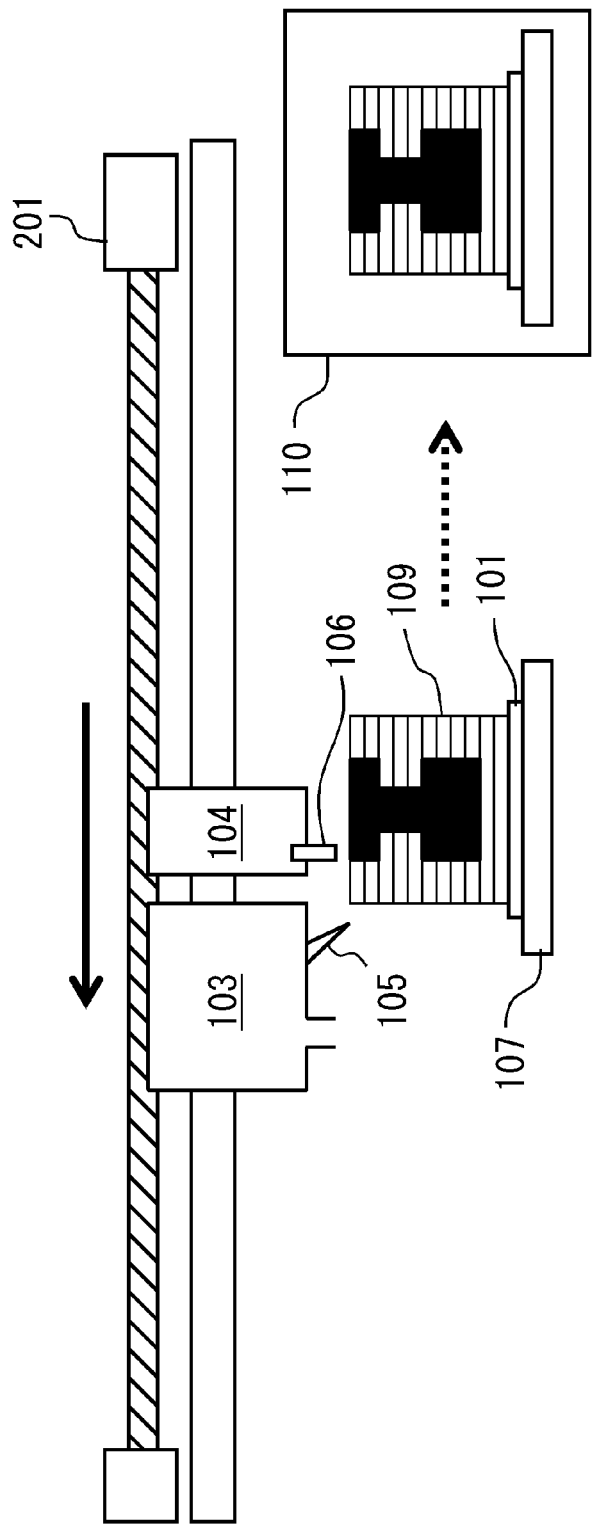
FIG. 12 schematically illustrates a shaping device according to Example 15.

FIG. 12 illustrates a shaping device according to Example 15. The difference in configuration from Example 9 is that the first unit for producing the layered body 109 and the second unit for heating the layered body 109 are provided separately.

Such a configuration eliminates the need for heat shielding of the heating area 110, and therefore the device can be reduced in size as compared with Example 9.

Moreover, since the fabrication of the layered body 109 and the heating of the layered body 109 can be performed simultaneously, the shaping speed is improved when a plurality of shaped articles is produced.

OTHER EMBODIMENTS

The present invention has been described hereinabove in specific embodiments, but the present invention is not limited to the above embodiments, and various modifications may be made without departing from the technical idea of the present invention. For example, in the Examples, only the second particles 2 are selectively sintered or melted by controlling the temperature of the heat treatment, but only the second particles 2 may be selectively sintered or melted by appropriately controlling the time or both the temperature and the time of the heat treatment. Moreover, in the Examples, the second particles 2 are arranged by using the particle-dispersed liquid including the second particles, but the second particles 2 may be also arranged in a powder state rather than in a liquid state. Further, in Example 14, the second liquid application unit 113 is provided after the liquid application unit 106, but the second liquid application unit 113 may be provided before the liquid application unit 106. Furthermore, the liquid application unit 106 may apply a solution (dispersion liquid not containing a binder) including second particles to the shaping region S, and the second liquid application unit 113 may apply the liquid binder to both the shaping region S and the non-shaping region N. In addition, the configurations of Examples 1 to 15 may be combined with each other as long as there are no technical contradictions or physical restrictions.

According to the present invention, it is possible to provide a shaping technique with few restrictions on shapes that can be shaped.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An object shaping method, comprising:
a step of forming a powder layer including first particles;
a step of placing second particles having a particle diameter smaller than a particle diameter of the first particles at a first region of the powder layer; and
a first heating step of heating at least a part including the first particles and the second particles,
wherein in the first heating step, the second particles are sintered or melted, and a heating temperature of the part is kept lower than a melting point of the first particles.

2. The object shaping method according to claim 1, further comprising:
a step of removing a powder of the powder layer located at a second region of the powder layer, which is outside the first region.

3. The object shaping method according to claim 2, further comprising:
a second heating step of heating the part after the step of removing the powder.

4. The object shaping method according to claim 3, wherein the second heating step comprises heating the part at a temperature higher than the heating temperature in the first heating step.

5. The object shaping method according to claim 1, wherein the first heating step is performed after repeating the step of forming the powder layer and the step of placing the second particles alternately a plurality of times.

6. The object shaping method according to claim 1, wherein an average particle diameter of the first particles is 1 μm to 500 μm.

7. The object shaping method according to claim 1, wherein the first particles and the second particles include at least one same component.

8. The object shaping method according to claim 1, wherein the second particles are composed mainly of a component contained in the first particles.

9. The object shaping method according to claim 1, wherein the first particles and the second particles are metal particles or ceramic particles.

10. The object shaping method according to claim 1, wherein the step of placing the second particles is a step of applying a liquid including the second particles to the first region.

11. The object shaping method according to claim 10, wherein the liquid includes a binder.

12. The object shaping method according to claim 11, wherein volume concentration of the binder in the liquid is equal to or smaller than 50 vol %, and/or wherein viscosity of the liquid is equal to or smaller than 50 cP.

13. The object shaping method according to claim 10, further comprising:
a step of drying the liquid performed between the step of applying the liquid and the first heating step.

14. The object shaping method according to claim 11, wherein an average particle diameter of the second particles is 1 nm to 500 nm.

15. The object shaping method according to claim 1, further comprising:
a step of pressurizing the powder layer performed between the step of forming the powder layer and the step of placing the second particles.

16. The object shaping method according to claim 1, further comprising:
a step of applying a binder to the powder layer performed between the step of forming the powder layer and the first heating step.

17. The object shaping method according to claim 16, wherein a region to which the binder is applied is a region outside the first region.

18. The method according to claim 1, wherein the first particles are configured to start sintering together at a first temperature as a temperature of the first particles increases, and the second particles are configured to start sintering together at a second temperature as a temperature of the second particles increases,
  wherein the first temperature is not higher than the melting point of the first particles, and the second temperature is not higher than a melting point of the second particles,
  wherein the second temperature is lower than the first temperature, and
  wherein in the first heating step, the heating temperature of the part is at least the second temperature and is kept below the first temperature.

19. The object shaping method according to claim 18, wherein the second temperature is at least 100° C. lower than the first temperature.

20. The object shaping method according to claim 18, wherein in the first heating step, the heating temperature is kept lower than 800° C.

21. The method according to claim 18, wherein the melting point of the first particles is lower than the melting point of the second particles.

22. The object shaping method according to claim 18, wherein in the first heating step, a powder of the powder layer located at a second region of the powder layer is heated to at least the second temperature, and the second region is outside the first region.

23. The object shaping method according to claim 2, wherein the step of removing is performed after the first heating step.

24. An object shaping method, comprising:
  a step of forming a powder layer including first particles;
  a step of placing second particles having a particle diameter smaller than a particle diameter of the first particles at a first region of the powder layer; and
  a first heating step of heating the powder layer at least at the first region and a second region of the powder layer; and
  a step of removing a powder of the powder layer located at the second region after the first heating step,
  wherein in the first heating step, the second particles are sintered or melted.

25. The method according to claim 24, wherein the first particles are configured to start sintering together at a first temperature as a temperature of the first particles increases, and the second particles are configured to start sintering together at a second temperature as a temperature of the second particles increases,
  wherein the first temperature is not higher than a melting point of the first particles, and the second temperature is not higher than a melting point of the second particles
  wherein the second temperature is lower than the first temperature, and
  wherein in the first heating step, a heating temperature of the powder of the powder layer located at the second region is kept lower than the first temperature.

26. The method according to claim 25, wherein in the first heating step, the powder of the powder layer located at the second region is heated at least at the second temperature.

27. The object shaping method according to claim 25, wherein the second temperature is at least 300° C. lower than the first temperature.

28. The object shaping method according to claim 24, further comprising:
  a second heating step of heating the part after the step of removing the powder.

29. The object shaping method according to claim 24, wherein the first particles and the second particles contain different materials.

30. The object shaping method according to claim 24, wherein an average particle diameter of the second particles is 1 nm to 200 nm.

* * * * *